United States Patent [19]
Côté

[11] Patent Number: 5,148,843
[45] Date of Patent: Sep. 22, 1992

[54] TREE DELIMBER WITH TREE FEEDING MEANS

[76] Inventor: Jean-Marie Côté, 14828 Labelle, Pierrefonds, Quebec, Canada, H9H 1J3

[21] Appl. No.: 711,071

[22] Filed: Jun. 6, 1991

[30] Foreign Application Priority Data

Jun. 28, 1990 [CA] Canada ................... 2020113

[51] Int. Cl.⁵ ............................................. B27L 1/00
[52] U.S. Cl. ..................................... 144/2 Z; 144/343
[58] Field of Search ..................... 144/2 Z, 3 D, 343

[56] References Cited

U.S. PATENT DOCUMENTS 4,919,175  4/1990  Samson ........................ 144/2 Z

FOREIGN PATENT DOCUMENTS 986821   4/1976  Canada.
1083016  8/1980  Canada ........................ 144/2 Z
727430   4/1980  U.S.S.R. ...................... 144/2 Z
899350   1/1982  U.S.S.R. ...................... 144/2 AA Primary Examiner—W. Donald Bray

[57] ABSTRACT

A tree delimber having a boom assembly with a sleeve, and a boom slidable through the sleeve. Tree gripping means are mounted on the front end of the boom and the tree delimbing means are mounted on the sleeve. Tree feed means are also mounted on the sleeve.

The tree feed means of the tree delimber comprise feed rollers for moving a tree past the delimbing means. Three feed rollers are provided with one roller fixed on the sleeves and the other two rollers movable toward each other and the one roller to hold a tree between all three rollers so as to feed the tree. The other two rollers are movable away from each other and the one roller to load or unload a tree to or from the rollers.

A method of operating the delimbing machine, particularly when tree feeding during delimbing is interrupted, is also disclosed.

26 Claims, 4 Drawing Sheets

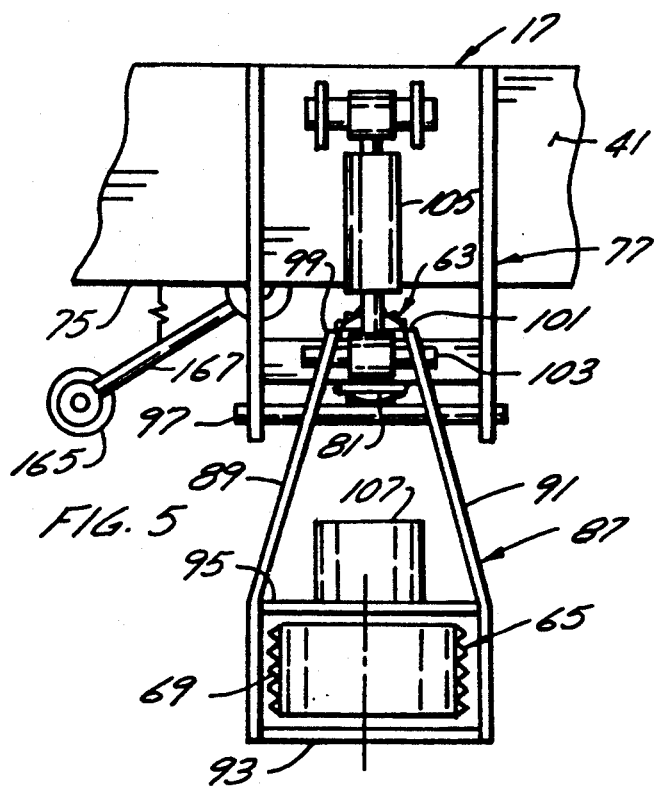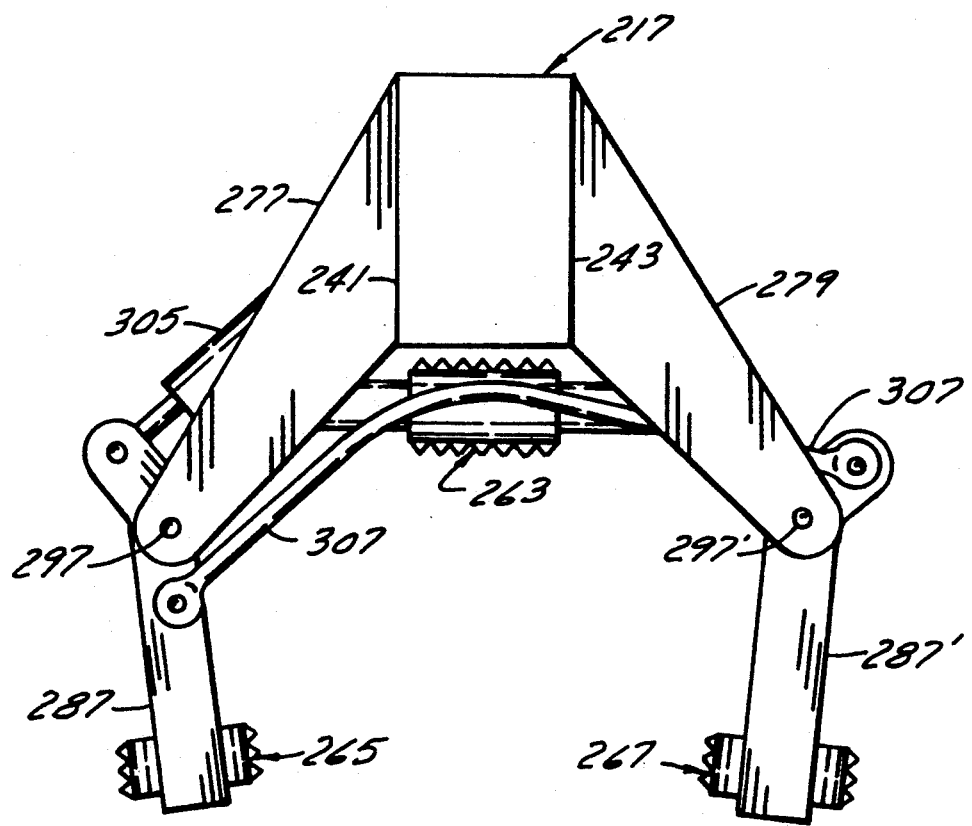

TREE DELIMBER WITH TREE FEEDING MEANS

BACKGROUND OF THE INVENTION

1. Field of the Invention

This invention is directed toward an improved tree delimber machine.

The invention is more particularly directed toward a tree delimber machine with improved tree feed means.

2. Description of the Prior Art

The invention is also directed toward a method of operating the tree delimbing machine, particularly when tree feeding during delimbing is interrupted.

Tree delimbers with a boom assembly having a boom sliding through a sleeve are known. Tree gripping means are mounted on the front of the sleeve and tree gripping and delimbing means are mounted on the front of the boom. To delimb a tree, the boom assembly is operated to have the tree gripping and delimbing means on the boom pick up the tree near its butt end and place the tree via its butt end in the gripping means on the sleeve. The boom is then extended to have its gripping and delimbing means delimb the tree while it is held by the gripping means on the sleeve.

These known delimbers cannot however delimb very long trees because of physical limitations on the length of the boom. It is known to provide delimbers of above type having a passageway for the tree directly behind the gripping means on the sleeve. With the passageway, a long tree can be initially gripped by its butt end and partly delimbed by a full stroke of the boom. The boom then grips the tree at the end of its stroke, the tree gripping means on the sleeve releases its hold, and the boom is returned moving the delimbed portion of the tree through the passageway. The tree gripping means on the sleeve then grips the tree about mid-center. A second stroke of the boom now completes delimbing. The delimber with a passageway is relatively slow however since the tree and the delimber means must be repositioned between strokes.

It is also known to provide delimbers that have feeding means to feed a tree rearwardly past fixed or stationary delimbing means to delimb it. To speed up delimbing, second delimbing means can be provided on the front end of the boom and the boom can be moved forwardly simultaneously while the tree is being moved rearwardly to delimb both ends of the tree. An example of such a machine is shown in Canadian Patent 986,821 by way of example. The known machine is however quite complicated in construction having the tree feeding means separated from the boom assembly. In addition, the tree feeding means are relatively complicated requiring two sets or pairs of feeding rolls.

SUMMARY OF THE INVENTION

It is the purpose of the present invention to provide a tree delimber machine of the type that employs tree feeding means with the machine having a simpler and more efficient construction than known machines.

It is also a purpose of the present invention to provide a tree delimber machine with improved and simplified tree feeding means.

In accordance with the present invention there is provided a tree delimber machine having a boom assembly mounted on top of a boom support. The boom assembly employs a sleeve with a boom slidably mounted with respect to the sleeve. Tree gripping means are mounted on the outer end of the boom. Tree delimbing means are mounted on the outer end of the sleeve. Tree feeding means are mounted on the sleeve directly under the boom and directly behind the delimbing means. The location of the tree feeding means on the boom assembly directly under the boom and directly behind the delimbing means simplifies the delimbing machine and makes it easier handling the trees.

Preferably a passageway extends through the boom support, through which a tree being delimbed can pass. The tree delimbing means and the tree feeding means are located on the sleeve directly in front of the inlet to the passageway thereby further simplifying tree handling during delimbing.

The novel tree feeding means employed comprise three feed rollers with one of the rollers fixedly located on the bottom of the sleeve and the other two rollers swingably mounted on the sleeve to move inwardly and upwardly toward the one top roller so as to grip a tree between all three rollers. The two swingable rollers tightly hold the tree against the top fixed roller. Rotation of all the rollers feeds the tree past them. The three rollers, in feeding the tree, are generally spaced apart about its periphery. The three point contact on the tree provides more positive feeding than that provided by a pair of rolls. Having a single top fixed roll with the other two rolls biased up against it also simplifies the feeding arrangement.

The tree delimber of the present invention has means for selectively positioning the delimbing means on the sleeve between one of: an open position to receive a tree to be delimbed; a clamp position to tightly grip a tree; and a float position to loosely hold a tree. The gripping means on the boom can also be selectively positioned between one of: an open position to receive a tree to be delimbed; a clamp position to tightly grip a tree; and a float position to loosely hold a tree. During normal delimbing, when the tree feeding means is operating, the delimbing means are in a float position to delimb the tree as it is fed past the delimbing means. At this time, the gripping means, about fifteen, twenty feet in front of the delimbing means, are in an open position. The limbs of the tree normally pass by the open gripping means during delimbing by the delimbing means. However, a large limb may not pass by the gripping means, stopping movement of the tree even though the feeding means are still operating. If this occurs, the delimber operator can stop the feeding means, move the delimbing means to a clamp position to tightly grip the tree and move the gripping means to a float position to loosely hold the tree. The gripping means can now be moved away from the delimbing means by moving the boom so as to remove the large limb with the gripping means. After removing the large limb, delimbing continues as before with the delimbing means.

Preferably, in accordance with the present invention, means are provided for monitoring tree movement during delimbing. When tree stoppage is detected such as when a large limb does not pass by the gripping means, by the monitoring means, means are provided for automatically stopping the tree feeding means, gripping the tree with delimbing means, moving the gripping means to a float position, and moving the boom a predetermined short distance to remove the large limb with the gripping means. After the gripping means has moved the predetermined distance the delimber automatically reverts to normal delimbing.

The tree movement monitoring means can comprise a wheel adapted to rest on the tree and to be rotated by tree movement. The rate of movement of the wheel is compared with the rate of movement of the tree feeding means. If the wheel stops rotating while the tree feeding means continues to operate then a comparison of the movement rates will indicate that the tree is stopped. This comparison preferably is used to automatically trigger delimbing with the gripping means.

The invention is particularly directed toward a tree delimber machine having a boom support and a boom assembly mounted on the boom support. The boom assembly has a sleeve and a boom slidably mounted through the sleeve. Tree gripping means are on the front end of the boom and tree delimbing means are on the front end of the sleeve. Tree feed means are also on the sleeve behind the tree delimbing means.

The invention is also particularly directed toward a tree delimber machine having delimbing means and feeding means for moving a tree past the delimbing means. The feeding means comprises three feed rollers and means for rotating each feed roller. The first feed roller is fixed in position on the machine. Means move the second and third feed rollers between a tree feeding position where the three rollers contact a tree about its periphery at spaced-apart locations and a tree loading and unloading position where the second and third rollers are spaced farther away from each other and from the first feed roller than in the feeding position.

The invention is further particularly directed toward a method of delimbing a tree with a delimbing machine having tree gripping means, tree delimbing means, and tree feeding means. The method comprises the steps of loading the tree to be delimbed in the feeding means with the gripping means; releasing the gripping means; feeding the tree past the delimbing means with the tree feeding means to delimb it; monitoring tree movement while the tree feeding means are operating during delimbing with the delimbing means; and, on sensing stopping of tree movement, initiating gripping of the tree with the delimbing means and delimbing of the tree with the gripping means.

BRIEF DESCRIPTION OF THE DRAWINGS

FIG. 5 is a side view of the tree feeding means shown in FIG. 4;

FIG. 7 is a view similar to FIG. 4 showing an alternative construction.

DESCRIPTION OF THE PREFERRED EMBODIMENTS

Figure 1:
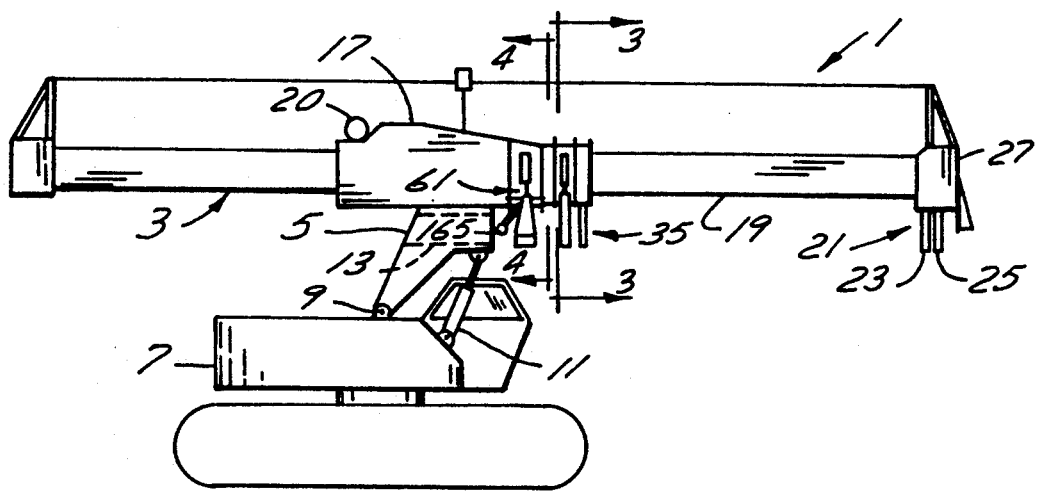
FIG. 1 is a side view of the tree delimber machine.
Figure 2:
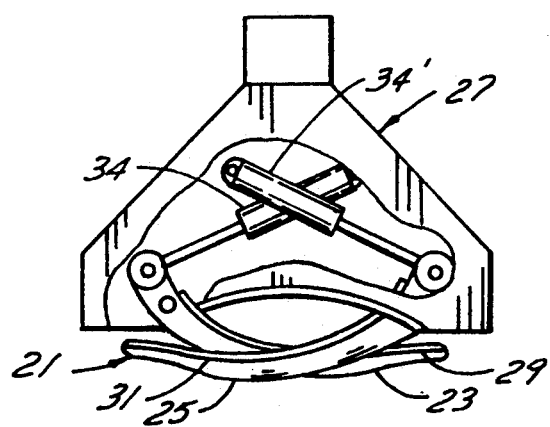
FIG. 2 is a detail front view of the boom.

The tree delimber machine 1 as shown in FIGS. 1 and 2 has a boom assembly 3 mounted on a boom support 5. The boom support 5 in turn is pivotally mounted on a vehicle 7 by means of a pivot 9. Rigid, extendable link means 11, pivotally connected between the boom support 5 and the vehicle 7, maintain the boom support 5, and the attached boom assembly 3 in a desired position. The boom support 5 has a generally horizontal, through passageway 13 (shown in dotted lines) in its upper portion, just beneath the boom assembly 3, through which a tree being delimbed can pass.

The boom assembly 3 has a tubular sleeve 17 mounted on top of the boom support 5. An elongated boom 19 is slidably moved back and forth through the sleeve 17 by suitable moving means such as a hydraulic motor 20 operating a gear and chain drive (not shown). Tree gripping means 21 are provided at the front end of the boom 19. The gripping means 21 include a pair of gripping arms 23, 25 that are pivotally mounted to a head frame 27 on the front end of the boom 19. The arms 23, 25 are longitudinally offset so that they can cross in a closed position to grab and hold a tree between them and the head frame 27. Cutting edges 29, 31 provided on the sides of the arms 23, 25, and a cutting edge 32 provided on a flange 33 on the front of the head frame 27 are used by the gripping means to delimb a tree. Hydraulic cylinders 34, 34' move the arms 23, 25 respectively between an "open" position to receive or release a tree; a tightly closed "clamp" position to tightly grip a tree; or a lightly closed "float" position to loosely hold a tree.

Figure 3:
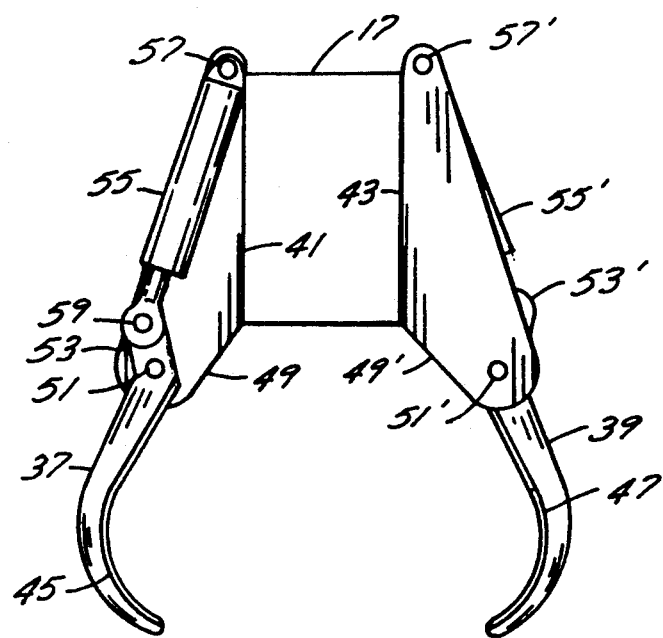
FIG. 3 is a detail cross-section view taken along line 3—3 of FIG. 1.

Tree delimbing means 35 are provided on the front end of the sleeve 17 of the boom assembly 3 as shown in FIGS. 1 and 3. These delimbing means 35 comprise a pair of curved arms 37, 39 pivotally mounted in brackets on each side 41, 43 of the sleeve 17 and longitudinally offset so that they can cross in a closed position to grip a tree between them. Cutting edges 45, 47 are provided on the sides of the arms 37, 39 for use in delimbing a tree as will be described.

In more detail, arm 37 is pivotally mounted to a bracket 49 by a pivot 51 just beneath and to one side of the sleeve 17. Bracket 49 is mounted on the side 41 of the sleeve 17. The pivot 51 is near the inner end 53 of the arm 37. A rigid, extendable link 55 is pivotally mounted at one end, via pivot 57, to the bracket 49, just above and to the side of sleeve 17. The other end of the link 55 is pivotally mounted via pivot 59 to the inner end 53 of the arm 37. Extension of link 55 will pivot the arm 37 about pivot 51 to a closed position beneath the sleeve 17, where it crosses with arm 39 when arm 39 is also in a closed position. Arm 39 is mounted in a similar manner with similar elements (designated with a prime) on the other side 43 of the sleeve 17. The extendable links 55, 55' preferably are hydraulic actuators. The arms 37, 39 are moved by the links 55, 55' between an "open" position to receive or release a tree; a tightly closed "clamp" position to tightly grip a tree; and a lightly closed "float" position to loosely hold a tree.

Figure 4:
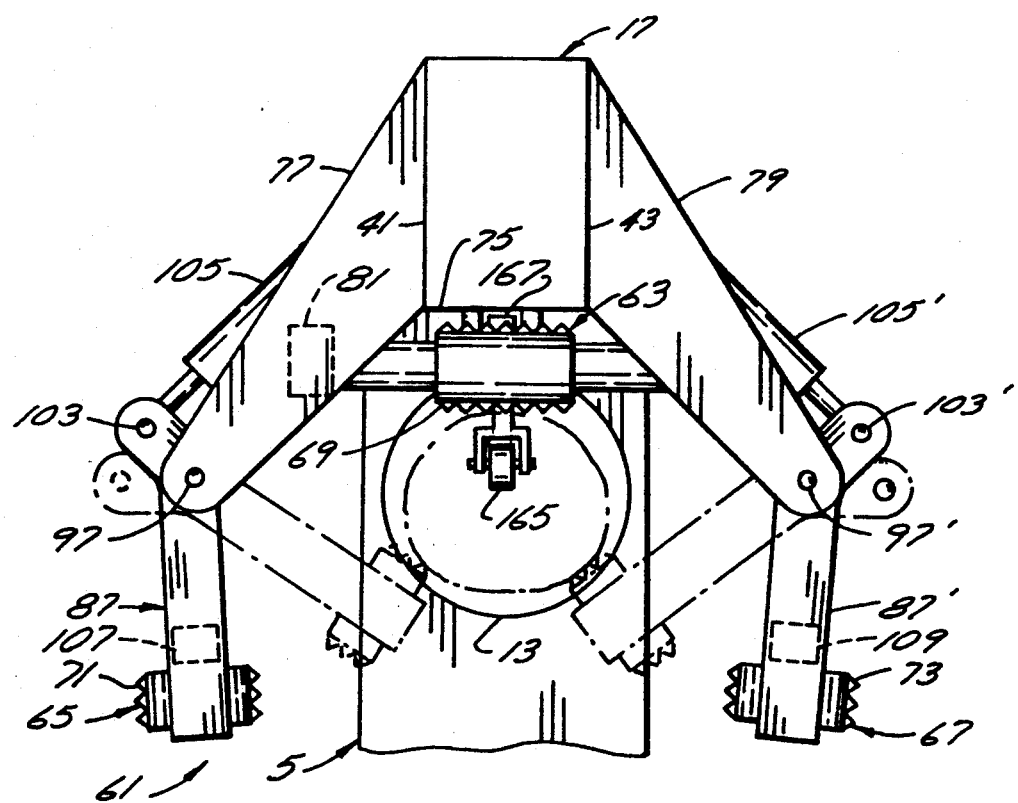
FIG. 4 is a detail cross-section view taken along line 4—4 of FIG. 1.

Tree feeding means 61 are also provided on the boom assembly 3. The tree feeding means 61 as shown in FIG. 1 are preferably located at the front of the sleeve 17, between the tree delimbing means 35 and the boom support 5. The tree feeding means 61 are mounted on the sleeve 17 but are located beneath it and are generally longitudinally aligned with the passageway 13 in the support 5. The tree feeding means 61 comprise three cylindrical feed rollers 63, 65, 67 as shown in FIG. 4. Each feed roller has projecting teeth 69, 71, 73 on its cylindrical surface to help the roller grip a tree.

A first of the feed rollers 63 is rotatably mounted adjacent the bottom 75 of the sleeve 17, in a fixed position, with its longitudinal axis horizontal and transverse to the longitudinal axis of the passageway 13. This first or top feed roller 63 is mounted between brackets 77, 79 extending downwardly and outwardly from the sides 41, 43 of the sleeve 17. The top feed roller 63 is located just below the top of the passageway 13 and is rotated by a hydraulic motor 81 mounted between one of the brackets 77, 79.

The second and third feed rollers 65, 67 are rotatably mounted on arms which in turn are pivotally mounted to the brackets 77, 79. Since both rollers 65, 67 are similarly mounted, the mounting of one only will be described in detail. Second roller 65, as shown in FIGS. 4 and 5, is rotatably mounted at the lower end of an arm 87 with its longitudinal axis transverse to the longitudinal axis of the passageway 13. The arm 87 comprises a pair of sideplates 89, 91 with a pair of spaced-apart cross plates 93, 95 at the lower ends of the sideplates 89, 91 joining them together. The roller 65 is rotatably mounted between crossplates 93, 95 with its axis generally parallel to the sideplates 89, 91. The arm 87 is pivotally mounted to the lower end of bracket 77 by a pivot 97 passing through the sideplates 89, 91 near their upper ends 99, 101. The sideplates 89, 91 adjacent their upper ends 99, 101 are pivotally mounted via a pivot 103 to a rigid, extendable link 105. The link 105 is pivotally mounted at its other end to the side 41 of the sleeve 17. Third roller 67 is mounted in a similar manner with similar elements (designated with a prime) to the bracket 79 on the other side 43 of the sleeve 17 and is aligned with second roller 65 and also first roller 63. The links 105, 105' are preferably hydraulic actuators. The second and third rollers 65, 67 are rotated by hydraulic motors 107, 109 mounted on the arms 87, 87'.

Figure 6:
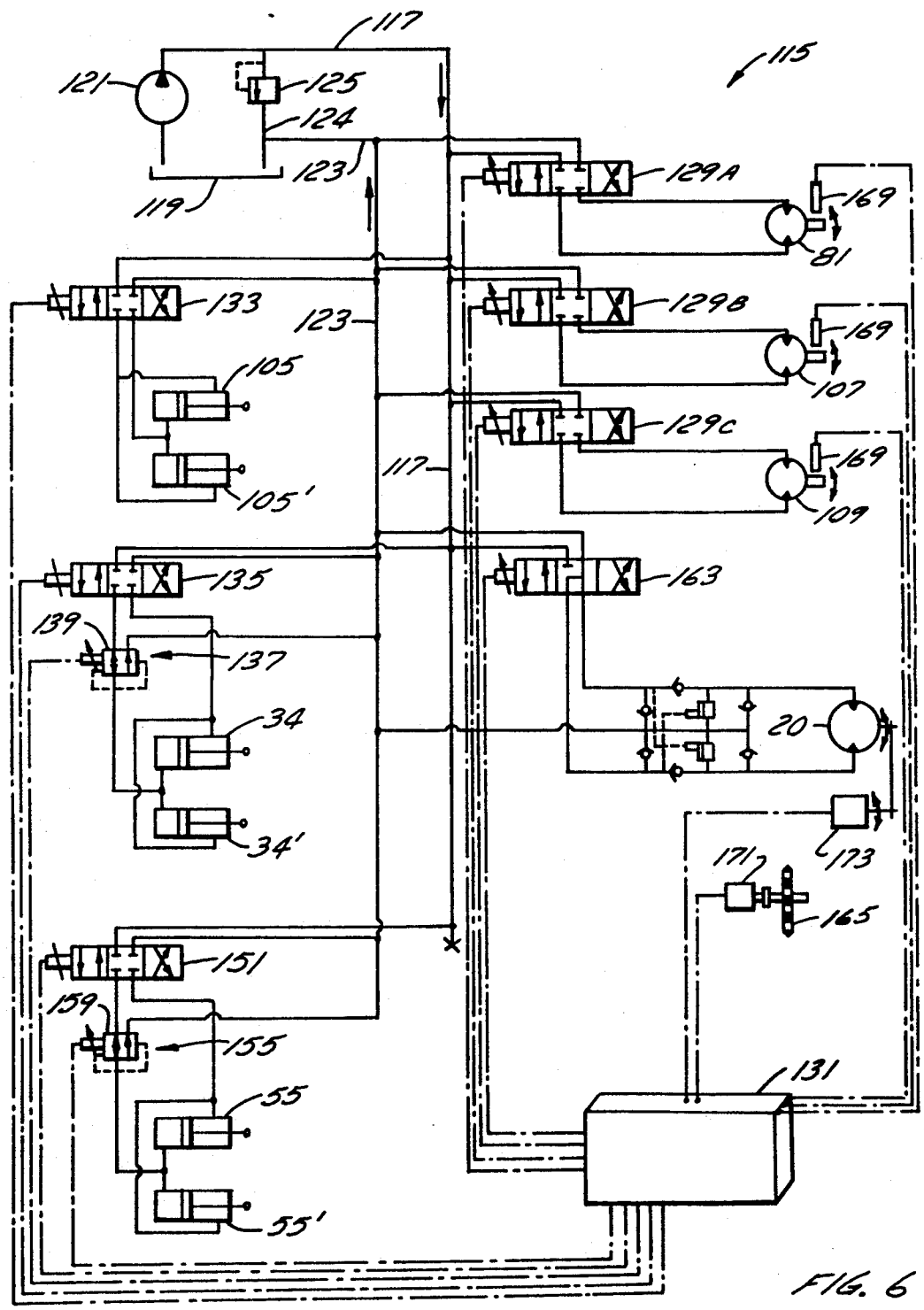
FIG. 6 is a schematic view of the hydraulic system.

The hydraulic system 115 for operating the delimber is shown in FIG. 6. The system 115 includes a main feed conduit 117 leading from the main hydraulic fluid reservoir 119 of the hydraulic system of the delimber. There is a pump 121 in the feed conduit 117. A main return conduit 123 leads back to the reservoir 119. A bypass line 124 connects the feed conduit 117 to the return conduit 123 via a pressure relief valve 125. Branch feed conduits connect the main feed conduit 117, through feed roller motor control valves 129A, 129B and 129C to one side of the hydraulic motors 81, 107, 109 which operate the feed rollers 63, 65, 67 respectively. Branch return conduits from the motors 81, 107, 109 connect to the main return conduit 123 through the control valves 129A, 129B, 129C. The control valves 129A, 129B, 129C can be selectively operated in unison through an electronic controller 131, controlled by the delimber operator, to cause the hydraulic motors 81, 107, 109 to rotate the feed rollers 63, 65, 67 in one direction or the other, or to allow them to rotate freely.

The hydraulic system 115 includes a feed roller arm control valve 133 for operating the hydraulic cylinders 105, 105' that respectively move the arms 87, 87' that control the position of feed rollers 65, 67. Branch feed and branch return conduits connect the main feed conduit 117 and the main return conduit 123 to the hydraulic cylinders 105, 105' via the control valve 133. The control valve 133 can be selectively operated through the controller 131 by the delimber operator to move the rollers 65, 67 inwardly and upwardly toward the fixed feed roller 63 to tightly grip a tree between all three rollers, or to move the rollers 65, 67 downwardly and outwardly from roller 63 to release a tree or to be in a position to receive a tree.

A gripping means control valve 135 is provided in the hydraulic system 115 for operating the hydraulic cylinders 34, 34' that move the gripping arms 23, 25. The control valve 135 can be selectively operated through the controller 131 to move the gripping arms 23, 25 between an "open" position to receive or release a tree, and a "clamp" position to tightly grip a tree. A gripping means "soft clamp" arrangement 137 is provided between the control valve 135 and the hydraulic cylinder 34, 34'. The "soft clamp" arrangement 137 when operated by the controller 131 reduces the pressure applied to the cylinders 34, 34'. A pressure reducing valve 139 in the "soft clamp" arrangement reduces the pressure. The reduced pressure applied is selected to allow the gripping arms 23, 25 to "float" on a tree loosely holding it.

Delimbing control valve 151 in the hydraulic system 115 operates the hydraulic cylinders 55, 55' that control the delimbing arms 37, 39. Operation of the control valve 151 by the controller 131 will move the arms 37, 39 between an "open" position to receive or release a tree and a "clamp" position to tightly grip the tree. A "soft clamp" arrangement 155 is provided between the control valve 151 and the hydraulic cylinders 55, 55'. The "soft clamp" arrangement 155 is similar to the "soft clamp" arrangement 137 and has a selectively operable pressure reducing valve 159 that can reduce the pressure applied by the cylinders 55, 55'. Operation of the valve 159 by the controller 131 reduces the pressure applied by the cylinders 55, 55' on the delimbing arms 37, 39 to allow the delimbing arms to "float" to loosely hold a tree.

A boom motor control valve 163 controls the operation of the hydraulic motor 20 moving the boom 19. Operation of the control valve 163 by the controller 131 will allow the motor 20 to rotate in one direction or the other moving the boom 19 in one direction or the other relative to the sleeve 17.

Tree movement monitoring means are provided on the delimber. These movement monitoring means include a freely rotatable wheel 165 mounted on the end of an arm 167. The arm 167 is pivotally mounted at its other end to the bottom of the sleeve 17 as shown in FIGS. 4 and 5 just behind the tree feeding means 61 and just in front of the passageway 13 in the boom support. Suitable resilient means 168 bias the arm 167 downwardly against a tree as it is held by the feed rollers 63, 65, 67 to have the wheel 165 bear against the top of the tree. Sensors 169 are provided on the delimber as shown in FIG. 6 to detect the speed of rotation of the hydraulic motors 81, 107, 109 which operate the feed rollers 63, 65, 67. A sensor 171 is also provided on the delimber to detect the speed of rotation of the wheel 165. A further sensor 173 is provided to detect the rotation of the boom motor 20. The sensors 169, 171 and 173 are connected to the controller 131.

In operation of the delimber, the boom 19 is extended from the sleeve 17 by the operator operating the hydraulic motor 20 through the controller 131 and the boom motor control valve 163. The boom 19 is also lowered by retraction of the link means 11. The gripping arms 23, 25 are moved to a "clamp" position to tightly grip a felled tree to be delimbed near its butt end. At this time the delimbing arms 37, 39 are in an "open" position and the bottom feed rollers 65, 67 are also in an open position to receive the tree. The boom 19 is now withdrawn and raised, if needed, to position the butt end of the tree within the rollers 65, 67 and within the open delimbing arms 37, 39. The roller arms 87, 87' are now moved by the operator through the controller 131 and control valve 133 to move the rollers 65, 67 inwardly and upwardly toward the fixed roller 63 so as to tightly grip the tree between the three rollers. The operator then starts the hydraulic motors 81, 107, 109 through control valves 129A, 129B, 129C to rotate the feed rollers 63, 65, 67 to feed the tree past the delimbing arms 37, 39 and through the passageway 13. In starting the motors 81, 107, 109, the controller 131, through control valve 151 and soft clamp 155 simultaneously moves the delimbing arms 37, 39 to a "float" position, loose about the tree so that the arms 37, 39 delimb the tree as it is fed past. The controller 131 also simultaneously opens the gripping arms 23, 25 which are located about fifteen to twenty feet in front of the delimbing arms 37, 39. As the tree is fed by the feed rollers past the delimbing arms, the cutting edges 45, 47 on the delimbing arms delimb the tree.

During delimbing, the wheel 165 is rotated by the tree and its speed of rotation is sensed by the sensor 171. The speed of rotation of the hydraulic motors 81, 107, 109 driving the feed rollers 63, 65, 67 is also sensed by sensors 169. The controller 131 compares the sensed speeds. When the speed of rotation of the wheel 165 is generally the same as the speed of rotation of the motors 81, 107, 109, delimbing by the delimber arms 37, 39 proceeds until a predetermined length of tree has been delimbed, or until a preselected minimum tree diameter is reached. A cutting tool (not shown) on the delimber then cuts the undelimbed portion of the tree off, the feed rollers are reversed, and the delimbed tree is removed from the delimber by the gripping arms as the delimber arms and feed rollers are opened.

During delimbing, a large limb may hit the open gripping arms 23, 25 and not pass by them halting movement of the tree. The wheel 165 stops rotating while the feed rollers 63, 65, 67 continue to rotate, spinning in place on the stopped tree. The controller 131 senses the difference in speeds and when the speed of the feed rollers has exceeded the speed of the sensing wheel by a predetermined amount or for a predetermined time, the controller automatically operates the delimber to cut off the large limb that has interfered with the tree movement. First, the controller, through control valve 151 and deactuation of soft clamp 155 moves the delimbing arms from the "floating" position to a "clamp" position on the tree. The feed motors 81, 107, 109 are placed in a free wheeling position by control valves 129A, 129B, 129C. When the delimbing arms 37, 39 reach a predetermined clamping pressure, the controller 131, through control valve 135 and "soft clamp" 137 moves the gripping arms 23, 25 from the open position to a float position where they loosely hold the tree adjacent the large limb. The controller 131 simultaneously causes the boom 19, through control valve 163 and motor 20, to move forward a predetermined distance, such as about six feet by way of example. This causes the grapple arms 23, 25 and the head frame 27, through delimbing edges 29, 31, 33, to delimb the large limb from the tree. After the boom 19 has moved forwardly the predetermined distance, as sensed by sensor 173, the controller automatically reverses motor 20 for the same distance, moves the delimbing arms 37, 39 to a "float" position from the "clamp" position, moves the gripping arms 23, 25 to an open position, and starts the feed rollers 63, 65, 67 to continue delimbing as before. Moving the boom forwardly a predetermined distance during reverse delimbing provides a long enough length of delimbed tree in front of the gripping arms 23, 25 to allow the feed rollers 63, 65, 67 to build up feeding speed before normal delimbing recommences.

In one delimbing mode as described above, the tree is moved rearwardly by the feed means 61, past the delimbing means 35, which are in a "float" position, to delimb it. To speed up the delimbing operation, a second delimbing mode can be employed whereby the boom 19 is simultaneously moved forwardly to delimb the top part of the tree, with the delimbing means on the gripping means 21 which are in a "float" position, while the tree is being moved rearwardly by the feed means 61 and its lower part is being delimbed by the delimber means 35 also in a "float" position.

In another embodiment of the invention, the arms holding the rollers 65, 67 could be actuated by a single, rigid, extendable link. As shown in FIG. 7, the arms 287, 287' holding the rollers 265, 267 are mounted on brackets 277, 279 by pivots 297, 297'. A single, rigid, extendable link 305 is pivotally connected between the end of arm 287 and the side 241 of the sleeve 217. A rigid, fixed-length link 307 is pivotally connected between arm 287, below pivot 297, and to the free end of the other arm 287' above its pivot 297'. As extendable link 305 extends to move roller 265 inwardly and upwardly, fixed-length link 307 simultaneously moves roller 267 inwardly and upwardly through its connection between arms 287 and 287'.

I claim:

1. A tree delimber machine having: a boom support; a boom assembly mounted on the boom support; the boom assembly having a sleeve, and a boom slidably mounted through the sleeve; means for moving the boom relative to the sleeve; tree gripping means on the front end of the boom; tree delimbing means on the front end of the sleeve; and tree feed means on the sleeve behind the delimbing means.

2. A tree declimber as claimed in claim 1 including means in the boom support defining a passageway for the tree beneath the boom assembly, the passageway longitudinally aligned with the tree feed means.

3. A tree delimber as claimed in claim 1 wherein the tree feed means comprise three feed rollers; means for rotating each feed roller; the first of the feed rollers being fixed on the sleeve, and means on the sleeve for moving the second and third feed rollers between a tree feeding position where the three rollers can contact a tree about its periphery and at spaced-apart locations, and a tree loading and unloading position where the second and third feed rollers are spaced farther away from each other and from the first feed roller than in the feeding position.

4. A tree delimber as claimed in claim 3 wherein the first roller is located adjacent to the bottom of the sleeve.

5. A tree delimber as claimed in claim 2 wherein the tree feed means comprise three feed rollers; means for rotating each feed roller; the first of the feed rollers being fixed on the sleeve, and means on the sleeve for moving the second and third feed rollers between a tree feeding position where the three rollers can contact a tree about its periphery and at spaced-apart locations, and a tree loading and unloading position where the second and third feed rollers are spaced farther away from each other and from the first feed roller than in the feeding position.

6. A tree delimber as claimed in claim 5 wherein the first roller is located adjacent to the bottom of the sleeve.

7. A tree delimber as claimed in claim 6 wherein the second and third rollers are fixed to arms pivotally mounted on the sides of the sleeve.

8. A tree delimber as claimed in claim 7 including a rigid extendable link pivotally connected between each arm and the side of the sleeve.

9. A tree delimber as claimed in claim 7 including a rigid extendable link pivotally connected between one arm and the side of the sleeve, and a rigid fixed-length link pivotally connected between the one arm and the other arm whereby movement of the one arm with the extendable link will automatically move the other arm with the fixed length link.

10. A tree delimber as claimed in claim 6 including tree delimbing edges on the gripping means on the front end of the boom.

11. A tree delimber as claimed in a claim 10 including means for causing the delimbing means on the front end of the sleeve to tightly grip a tree being delimbed.

12. A tree delimber as claimed in claims 3, 5 and 6 wherein the feed rollers can be reversibly rotated.

13. A tree delimber as claimed in claim 1 wherein the tree feed means comprise feed rollers mounted on the sleeve, means for rotating the feed rollers, and means for moving the feed rollers between an open, tree receiving position and a closed, tree gripping position.

14. A tree delimber as claimed in claim 13 wherein there are three feed rollers, one of the rollers fixedly mounted to the bottom of the sleeve, the other two rollers each mounted on an arm that is pivotally mounted to the sleeve.

15. A tree delimber as claimed in claim 1 including means for selectively positioning each of the gripping means and delimbing means to one of: an open tree receiving position; a tightly closed clamp position to tightly grip a tree; and a lightly closed float position to loosely hold a tree.

16. A tree delimber as claimed in claim 15 including means for monitoring tree movement during operation of the tree feed means and delimbing by the delimbing means when in a lightly closed float position, and means, on sensing stoppage of tree movement during operation of the tree feed means, stopping delimbing by the delimbing means and starting delimbing by the gripping means.

17. A tree delimber machine having: a sleeve; a boom slidably mounted in the sleeve; means for moving the boom relative to the sleeve; feed means on the sleeve for moving a tree in a direction generally parallel to the boom; means for moving the feed rollers between a closed tree feeding position and an open tree receiving position; gripping arms on the front of the boom; means for selectively positioning the gripping arms to one of: an open tree receiving position; a tightly closed clamp position to tightly grip a tree; and a lightly closed float position to loosely hold a tree; delimbing arms on the front of the boom in front of the rollers; and means for selectively positioning the delimbing arms to one of: an open tree receiving position; a tightly closed clamp position to tightly grip a tree; and a lightly closed float position to loosely hold a tree.

18. A tree delimbing machine as claimed in claim 17 including means for sensing stoppage of tree travel during feeding of the tree by the feed means and delimbing by the delimbing arms, and means for automatically initiating gripping of the tree by the delimbing arms and delimbing of the tree by the gripping arms when stoppage is sensed.

19. A tree delimber machine as claimed in claim 18 wherein the means for sensing stoppage of tree travel comprises: a wheel behind the feed means freely rotatable on the tree; means sensing the rotation of the freely rotatable wheel; means sensing the rotation of at least one of the feed rollers; and means comparing the rotation of the freely rotatable wheel with the rotation of the feed roller to sense if the tree is moving.

20. A method of delimbing a tree with a delimbing machine having gripping arms, delimbing arms, and tree feeding means comprising: loading the tree to be delimbed in the feeding means with the gripping arms; releasing the gripping arms; feeding the tree with the tree feeding means to delimb it with the delimbing arms; sensing stopping of tree movement while the tree feeding means are operating during delimbing with the delimbing arms; and, on sensing stopping of tree movement, initiating gripping of the tree with the delimbing arms and delimbing of the tree with the gripping arms.

21. A method as claimed in claim 20 wherein the gripping arms are moved away from the delimbing arms during delimbing by the gripping arms, and the tree feeding means are stopped.

22. A method as claimed in claim 21 wherein the gripping arms are moved a predetermined distance away from the delimbing arms during delimbing by the gripping arms, and after having moved the predetermined distance, delimbing by the gripping arms is stopped, the tree feeding means are started, and the delimbing arms release the tree and continue delimbing it.

23. A method as claimed in claim 20 wherein the stopping of tree movement is sensed by comparing the speed of tree movement with the speed of operation of the feeding means.

24. A method of delimbing a tree with a delimbing machine having a boom slidable in a sleeve, means for moving the boom, gripping arms on the boom, delimbing arms on the sleeve and tree feed rollers on the sleeve comprising: gripping a tree to be delimbed with the gripping arms and placing the tree within the delimbing arms and the feed rollers by moving the boom; closing the feed rollers onto the tree, moving the delimbing arms to be float position to loosely hold the tree, releasing the gripping arms, and operating the feed rollers to move the tree past the delimbing arms to delimb the tree.

25. A method as claimed in claim 24 including the step of monitoring tree movement during operation of the feed rollers, and, on sensing stoppage of tree movement; stopping operation of the feed rollers, moving the delimbing arms to a clamp position to tightly grip the tree, moving the gripping arms to a float position to loosely hold the tree, and moving the boom to move the gripping arms away from the delimbing arms to delimb the tree.

26. A method as claimed in claim 25 wherein the gripping arms are moved a predetermined distance away from the delimbing arms.

* * * * *